Figure 1:
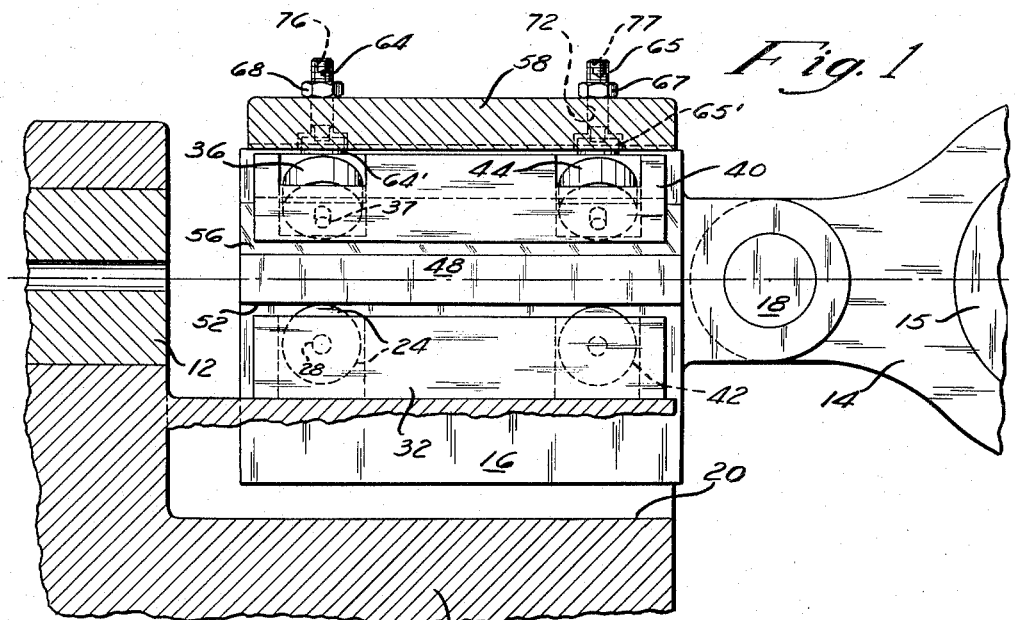

Dec. 22, 1959  R. G. FRIEDMAN  2,918,333
ROLLER BEARING HEADER SLIDE
Filed July 1, 1957  2 Sheets-Sheet 1

INVENTOR.
ROBERT G. FRIEDMAN
BY
RICHEY, WATTS, EDGERTON,
McNENNY & FARRINGTON
ATTORNEYS

Dec. 22, 1959    R. G. FRIEDMAN    2,918,333
ROLLER BEARING HEADER SLIDE
Filed July 1, 1957    2 Sheets-Sheet 2

INVENTOR.
ROBERT G. FRIEDMAN
BY
RICHEY, WATTS, EDGERTON,
McNENNY & FARRINGTON
Donald W. Farrington
ATTORNEYS 2,918,333
Patented Dec. 22, 1959

2,918,333

ROLLER BEARING HEADER SLIDE

Robert G. Friedman, Tiffin, Ohio, assignor to The National Machinery Company, Tiffin, Ohio, a corporation of Ohio Application July 1, 1957, Serial No. 668,936

4 Claims. (Cl. 308—6)

This invention relates to machines for making bolts or like headed articles and more particularly relates to a novel anti-friction supporting apparatus for header slides operable in such machines for facilitating ease and accuracy of movement of the machine header slide.

Broadly, this invention comprehends the provision of sets of bearings including a pair of each set disposed vertically for supporting only header slide loads and a pair disposed obliquely for guiding and positioning a header slide for accurate longitudinal reciprocation. Vertically disposed bearing surfaces are engageable with horizontal bearing tracks of the header slide and obliquely disposed bearings are engageable with corresponding oblique bearing tracks of the header slide. The oblique bearings are unitarily vertically adjustable for facilitating lateral positioning of the header slide.

In the operation of machines for making bolts and the like of the type disclosed in Patent No. 2,139,936 to William L. Clouse and assigned to the present assignee, it is highly desirable that reciprocating header slides in which forming dies are mounted, be restrained from lateral movement at all times and particularly at the moment when the die carried by the header is brought into contact with a stock piece. It is also important that such header slides be simply and accurately positionable laterally so as to enable proper positioning of the same in assembly of the machine in the first instance or any time after such initial installation to account for wear or expansion of parts due to heating by reason of friction therebetween. Furthermore, it is desirable that the header slide be freely reciprocable along its bearing tracks. Because of the heavy loads involved in machines of the type mentioned, such header slides are usually mounted to slide on bronze plates carried by the bed frame. In some instances the bronze plates are fixed to the header slide and ride in smooth ways machined in the bed frame. These expedients have been effective in reducing friction along the bearing surfaces but the present invention providing rolling friction between relatively moving surfaces of header slide and bed frame is a considerable improvement over such prior apparatus.

Accordingly, it is an object of this invention to provide a simple and effective apparatus facilitating free and accurate reciprocatory movement of a header slide in machines for making bolts, nuts and the like.

It is another object of the invention to provide a roller bearing mounting for a header slide for machines for making bolts and the like.

It is another object of the invention to provide a roller bearing mounting having a pair of opposed, obliquely disposed roller bearings adjustable to laterally position the header slide.

It is another object of the invention to provide a roller bearing support for a header slide for machines for making bolts and the like facilitating ease of movement of the same.

It is another object of this invention to provide a roller bearing support for a header slide for machines for making bolts and the like having spaced sets of bearings simultaneously imposing horizontal and vertical preload forces on the header slide.

Figure 2:
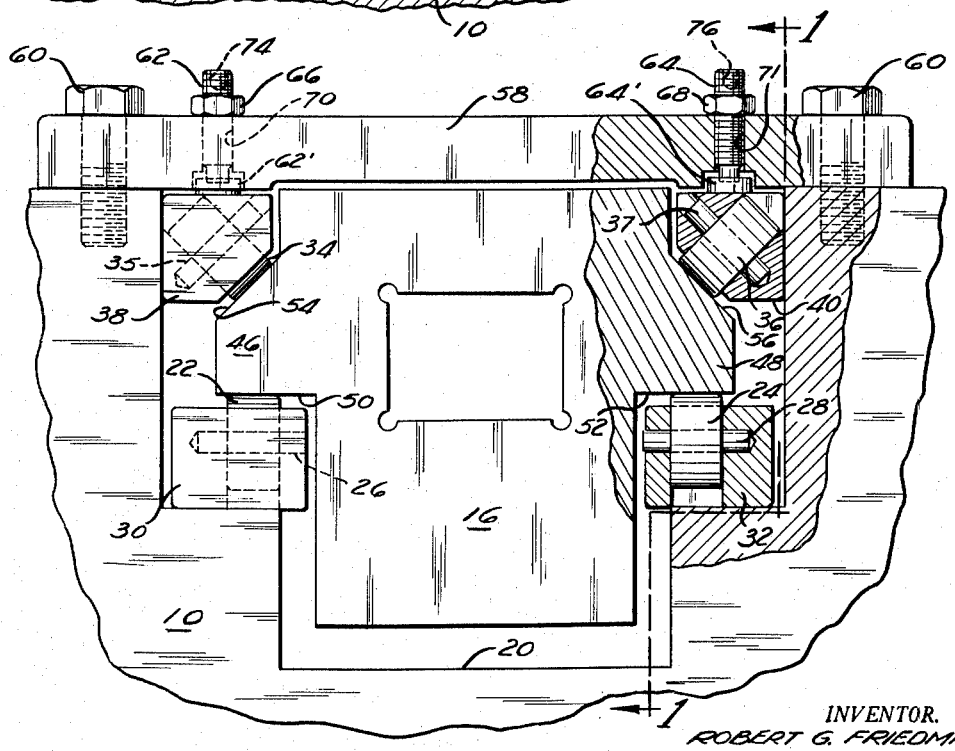
Figure 3:
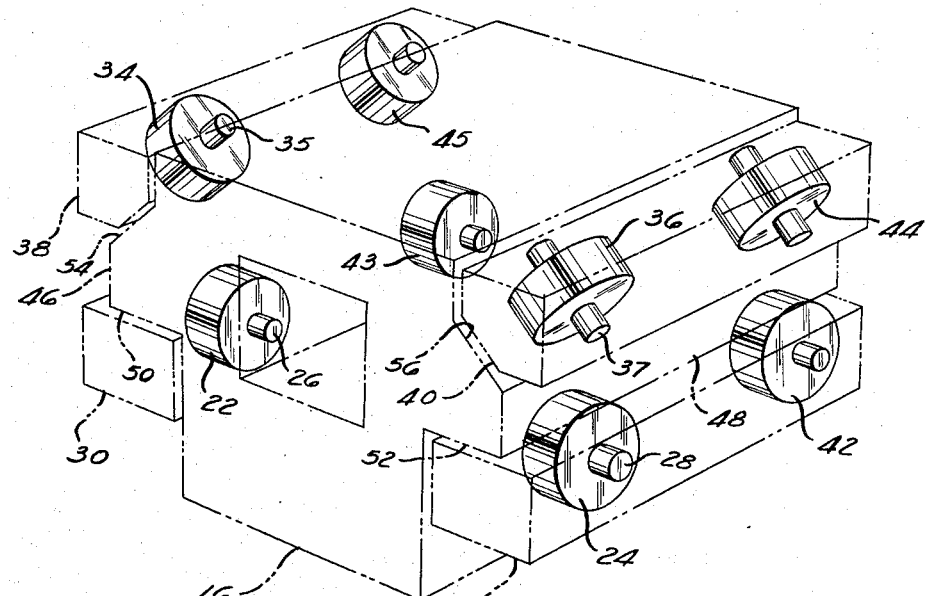

Other and further objects and advantages will become apparent from a detailed description of the invention taken with the accompanying drawing in which:

Fig. 1 illustrates a sectional side view taken along section 1—1 of Fig. 2, of a bolt making machine incorporating the features of the invention herein set forth, Fig. 2 illustrates an enlarged, partially cross-sectional end view of a header slide and roller bearing mounting apparatus according to the invention, and Fig. 3 illustrates a view of the roller bearings as disposed with respect to a header slide shown in phantom.

Referring now more particularly to the drawings showing portions of a machine for making bolts and the like, 10 represents a bed frame of the machine, on which is mounted a stationary bed frame die 12, a pitman 14 reciprocable by a crankshaft 15 and a header slide 16 secured to pitman 14 by a wrist pin 18. The bed frame 10 is provided with a longitudinal channel 20 shown more clearly in Fig. 2 of the drawing for receiving header slide 16.

According to a feature of this invention, header slide 16 is restrained from vertical or lateral movement by mounting between sets of roller bearings. A first set of such bearing shown in Fig. 2, comprises a first pair of vertically disposed bearings 22, 24 rotatable about respective axles 26 and 28 which in turn are mounted in bearing supports 30 and 32 removably secured to the bed frame in any suitable manner and a first pair of obliquely disposed bearings 34 and 36 rotatable about respective axles 35 and 37 mounted in bearing supports 38 and 40. Supports 30, 32, 38 and 40 may be elongated so as to extend to and support another set of bearings longitudinally displaced from the described set as shown in Figs. 1 and 3 and having a pair of vertically disposed bearings 42 and 43, and a pair of obliquely disposed bearings 44 and 45. Bearing supports 38 and 40 abut the side walls of channel 20 and are vertically adjustable along such walls in a manner hereinafter explained.

Header slide 16 is provided with a pair of laterally protruding, opposed rails 46 and 48 with horizontal, planar surfaces 50 and 52, and oblique, planar surfaces 54 and 56 extending along lower and upper sides thereof, respectively.

Bearings 22, 24, 42 and 43 support header slide 16 for free longitudinal reciprocation by bearing against respective planar surfaces 50 and 52 and bearings 34, 36, 44 and 45 bear against respective oblique planar surfaces 54 and 56 to impart a vertically downward force and opposed lateral forces thereto to keep the same in fixed lateral and horizontal position.

For maintaining oblique bearings 34 and 36 against rails 46 and 48, a cover plate 58 secured to bed frame 10 by bolts 60 shown in Fig. 2, is provided to receive four stud bolts, three of which are shown at 62, 64 and 65, threadedly engaging bores 70, 71 and 72 in plate 58 and bearing against respective sockets 62', 64' and 65' engaging the upper sides of the respective supports 38 and 40. Stud bolts 62, 64 and 65 may be turned and secured in any tightened position by respective lock nuts 66, 68 and 67 threaded thereon to engage plate 58 after the studs are tightened by appropriate keys fitting into key sockets 74, 76 and 77 in the ends of the studs. It is noted that tightening of bolt 62 is effective to impart a force to rail 46 having a vertically downward component and a component to the right as observed in Fig. 2 and that tightening of bolt 64 is effective to impart a force on rail 48 having a downward and a leftward component as viewed in Fig. 2. Accordingly, a simultaneous or uniform tightening of bolts 62 and 64 is effective to apply uniform forces normal to the faces 54 and 56 of respective rails 46 and 48. When bolts 62 and 64 are locked in such tightened position they apply forces which have uniform vertical components urging the header slide downward into engagement with the supporting roller bearings to impose a vertical preload on the header slide 16 and further have equal and opposite lateral components so as to impose lateral preload on header slide 16. Such preload forces are effective to increase the stability and accuracy of movement of the header slide.

Bolts 62, 64 and 65 are readily adjustable for either increasing or decreasing preload or may be tightened or loosened to account for wear or expansion of the header slide as the case may be. Bearings 44 and 45 which are spaced from bearings 22, 24, 34 and 36, may be similarly tightened to secure header slide 16 into position at a spaced point to provide precision movement thereto.

It is also observed that header slide 16 may be laterally positioned by the manipulation of bearing supports 38 and 40. For example, leftward movement of header slide 16 as viewed in Fig. 2 of the drawings may be effected by a vertically upward movement of stud bolt 62 and a vertically downward movement of stud bolt 64, to force bearing 36 between the fixed wall of channel 20 and oblique surface 56 and to therefore force header slide 10 to the left. After header slide 16 is positioned in the manner indicated, stud bolts 62 and 64 are uniformly tightened to a snug fit to secure header slide 16 firmly in position.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

I claim:

1. In a machine for making bolts or the like, a bed frame, said bed frame having a horizontal channel, a longitudinally disposed bearing rail mounted in the channel at each side thereof and supported therein by the bed frame, each of said horizontal bearing rails having a roller bearing mounted therein adjacent each end of the bearing rail, a horizontally disposed header slide mounted in said channel, said header slide having a horizontal shelf at each side thereof proportioned to overhang said horizontal bearing rails, said header slide having an inclined bearing surface at each side thereof sloping at an angle of approximately 45°, a second pair of bearing rails arranged in said channel above said inclined bearing surface, said last-named bearing rails having a vertical surface arranged to bear against a side wall of said channel, each of said last-named bearing rails having a roller bearing mounted therein adjacent each end thereof with the axis of rotation disposed parallel to said inclined surface on the header slide, a cap extending horizontally across said channel above said header slide and being anchored to the bed frame at each side of the channel, an adjusting screw mounted in said cap above the ends of said last-named bearing rails whereby said last-named bearing rails may be adjusted vertically in the channel and thereby adjust the header slide laterally in the channel and pre-load all of said bearings to maintain accuracy of the header slide during its reciprocation in the channel.

2. A machine for making bolts comprising a bed frame, said bed frame having a horizontally extending channel therein to receive a header slide, means to reciprocate the header slide in the channel, a supporting shelf at each side of said channel, a horizontally disposed bearing rail mounted on said shelf at each side of the channel, said horizontally disposed bearing rail having roller bearings journalled therein with the upper periphery of the roller bearing projecting above the surface of the rail, a header slide mounted in said channel, said header slide having a laterally extending wing at each side thereof intermediate the upper and lower surfaces of the header slide, said laterally extending wing having a lower bearing surface overhanging the roller bearings in said bearing rails, said laterally extending wing having an upper bearing surface inclined with respect to the horizontal axis of the header slide at approximately 45°, a floating bearing rail arranged in said channel above each of said laterally extending wings, said floating bearing rail having spaced roller bearings therein journalled on an axis parallel to the adjacent inclined bearing surfaces on the header slide wing, the periphery of each of said roller bearings projecting beyond the surface of the bearing rail to ride against the inclined surface on the header slide, a cover over said channel, said cover being anchored to the bed frame at each side of the channel, adjusting screws threaded into said cover and adapted to bear against the upper surface of said floating bearing rails whereby the floating rails may be adjusted vertically with respect to each other and thereby adjust the header slide horizontally in the channel, and whereby all of said roller bearings may be pre-loaded to maintain accurate reciprocation of the header slide.

3. In a machine for making bolts or the like, a bed frame, said bed frame having an upwardly open horizontal channel, a longitudinally disposed bearing rail mounted on each side of the channel beneath the top surface of the bed frame, each of said horizontal bearing rails having a roller bearing mounted therein adjacent each end of the bearing rail, a horizontally disposed header slide mounted for reciprocation in said channel, said header slide having a portion projecting horizontally therefrom at each side thereof and proportioned to overhang said horizontal bearing rails, said header slide portion having an inclined bearing surface sloping at an angle of approximately 45°, a second pair of bearing rails arranged in said channel above said inclined bearing surface, said last-named bearing rails having a vertical surface arranged to bear against a sidewall of said channel, each of said last-named bearing rails having a roller bearing mounted therein to bear against said inclined surface on the header slide, a cap mounted horizontally across said channel above said header slide, means to anchor the cap to the bed frame at each side of the channel, adjusting screws mounted in said cap above the ends of said last-named bearing rails whereby said last-named bearing rails may be adjusted vertically in the channel and thereby adjust the header slide laterally in the channel.

4. A machine for making bolts comprising a bed frame, said bed frame having a horizontal header slide formed therein, means to reciprocate the header slide in the channel, a supporting shelf at each side of said channel near the lower part of the channel, a horizontally disposed bearing rail mounted on each shelf, said horizontally disposed bearing rails having roller bearings horizontally journalled therein to project above the surface of the rail, said header slide having a laterally extending wing above the lower surface of the header slide, said laterally extending wing having a lower horizontal bearing surface overhanging the roller bearings in said bearing rails, said laterally extending wing having an upper bearing surface inclined with respect to the horizontal at approximately 45°, a movable bearing rail arranged in said channel above said laterally extending wing, said movable bearing rail having spaced roller bearings therein journalled on an axis parallel to the said inclined bearing surfaces on the header slide, the periphery of each of said last-named roller bearing projecting from the bearing rail to ride against the inclined surface on the header slide, a cover over said channel, said cover being anchored to the bed frame at each side of the channel, vertical adjusting screws threaded into said cover and adapted to bear against the upper surface of said movable bearing rails whereby the movable rails may be adjusted vertically with respect to each other and thereby adjust the header slide horizontally in the channel.

References Cited in the file of this patent

UNITED STATES PATENTS

| | | |
|---|---|---|
| 1,794,836 | De Walt | Mar. 3, 1931 |
| 1,811,508 | Klages | June 23, 1931 |
| 2,185,304 | Knapp | Jan. 2, 1940 |
| 2,315,846 | Fritzsch | Apr. 6, 1943 |
| 2,525,712 | Neighbour | Oct. 10, 1950 |